US009418564B2

(12) United States Patent
Claybrough et al.

(10) Patent No.: US 9,418,564 B2
(45) Date of Patent: Aug. 16, 2016

(54) METHOD FOR DETERMINING A GUIDANCE LAW FOR OBSTACLE AVOIDANCE BY AN AIRCRAFT, RELATED COMPUTER PROGRAM PRODUCT, ELECTRONIC SYSTEM AND AIRCRAFT

(71) Applicant: THALES, Courbevoie (FR)

(72) Inventors: Matthieu Claybrough, Toulouse (FR); François Colonna, Toulouse (FR); Marc Riedinger, Toulouse (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 14/625,739

(22) Filed: Feb. 19, 2015

(65) Prior Publication Data

US 2015/0254991 A1 Sep. 10, 2015

(30) Foreign Application Priority Data

Mar. 4, 2014 (FR) ..................................... 14 00537

(51) Int. Cl.
*G08G 5/04* (2006.01)
*G05D 1/00* (2006.01)
(Continued)

(52) U.S. Cl.
CPC .............. *G08G 5/045* (2013.01); *G05D 1/0061* (2013.01); *G05D 1/0607* (2013.01); *G05D 1/0825* (2013.01); *G06F 17/10* (2013.01); *G08G 5/0021* (2013.01)

(58) Field of Classification Search
CPC . G05D 1/0061; G05D 1/0825; G05D 1/0638; G08G 5/045; G08G 5/0021; G06F 17/10
USPC .............................. 701/3, 400, 301; 340/945
See application file for complete search history.

(56) References Cited

U.S. PATENT DOCUMENTS 5,892,462 A 4/1999 Tran
8,229,662 B2 7/2012 Subelet et al.
(Continued)

FOREIGN PATENT DOCUMENTS

EP 1797488 6/2007
EP 2 546 715 1/2013
(Continued)

OTHER PUBLICATIONS

French Search Report dated Nov. 10, 2014, which issued during prosecution of French Application No. 14 00537, which corresponds to the present application.

*Primary Examiner* — Marthe Marc-Coleman
(74) *Attorney, Agent, or Firm* — Troutman Sanders LLP

(57) ABSTRACT

This method for determining an obstacle avoidance guidance law for an aircraft is implemented by a system for determining said guidance law. The aircraft comprises a collision avoidance system adapted to detect a collision risk with the obstacle and said determination system. This method comprises determining one or more set points from among flight path angle and speed set points, at least one set point depending on at least one vertical speed limit value, at least one set point comprising a vertical component in a vertical direction, each limit value being provided by the collision avoidance system following the detection of a collision risk with the obstacle; and computing the avoidance guidance law as a function of the determined set points. During the determination step, at least one determined set point comprises a longitudinal component in a longitudinal direction perpendicular to the vertical direction.

14 Claims, 3 Drawing Sheets

(51) Int. Cl.

| | |
|---|---|
| ***G05D 1/08*** | (2006.01) |
| ***G06F 17/10*** | (2006.01) |
| ***G05D 1/06*** | (2006.01) |
| *G08G 5/00* | (2006.01) |

(56) References Cited

U.S. PATENT DOCUMENTS

| | | | | |
|---|---|---|---|---|
| 8,249,799 | B2 | 8/2012 | Flotte et al. | |
| 8,554,392 | B2 | 10/2013 | Dal Santo | |
| 8,725,401 | B2 | 5/2014 | Daveze et al. | |
| 2002/0039070 | A1 | 4/2002 | Ververs et al. | |
| 2004/0239529 | A1 | 12/2004 | Tran | |
| 2005/0113985 | A1 * | 5/2005 | Greene | G08G 5/045 701/9 |
| 2008/0021647 | A1 | 1/2008 | Daveze et al. | |
| 2008/0319671 | A1 * | 12/2008 | Subelet | G08G 5/0086 701/301 |
| 2009/0138145 | A1 * | 5/2009 | Meunier | G01C 23/00 701/9 |
| 2010/0106419 | A1 | 4/2010 | Flotte et al. | |
| 2013/0175385 | A1 | 7/2013 | Eglin | |

FOREIGN PATENT DOCUMENTS

| | | |
|---|---|---|
| FR | 2 876 483 | 4/2006 |
| FR | 2 932 306 | 12/2009 |
| WO | 2007/054482 | 5/2007 |

* cited by examiner

METHOD FOR DETERMINING A GUIDANCE LAW FOR OBSTACLE AVOIDANCE BY AN AIRCRAFT, RELATED COMPUTER PROGRAM PRODUCT, ELECTRONIC SYSTEM AND AIRCRAFT

CROSS REFERENCE TO RELATED APPLICATIONS

The present application claims priority to French Patent Application No. 14 00537 filed Mar. 4, 2014, which is herein incorporated by reference in its entirety.

FIELD OF THE INVENTION

The present invention relates to a method for determining an avoidance guidance law for an aircraft, such as a rotary wing aircraft, to avoid one or more obstacles. The aircraft comprises a collision avoidance system adapted to detect a collision risk with the obstacle(s) and electronic system for determining the avoidance guidance law.

BACKGROUND OF THE INVENTION

A method known in the art is implemented by the system for determining the avoidance guidance law, and comprises the following steps:

a) determining one or more set points from among flight path angle and speed set points, at least one set point depending on at least one vertical speed limit value, at least one set point comprising a vertical component in a vertical direction, each vertical speed limit value being provided by the collision avoidance system following the detection of a collision risk with the obstacle(s); and b) computing the avoidance guidance law as a function of the determined set point(s).

The invention also relates to a non-transitory computer-readable medium including a computer program product suitable for carrying out such a determination method.

The invention also relates to an electronic system for determining the avoidance guidance law.

The invention also relates to an aircraft, such as a rotary wing aircraft, comprising a collision avoidance system adapted to detect a collision risk with one or more obstacles and one such electronic system for determining the avoidance guidance law.

A determination method and system of the aforementioned type are known from document EP 1,797,488 B1.

The aircraft is a transport airplane, and when the collision avoidance system detects a collision risk, it emits an alarm. The collision avoidance system also uses a vertical speed limit to determine a vertical speed set point. An avoidance guidance law, in particular a load factor set point, is next computed as a function of the determined vertical speed set point.

The computed load factor set point depends on a difference between the value of the current vertical speed and the determined vertical speed set point, that difference being multiplied by a variable depending on the current speed of the aircraft.

The computed load factor set points are next automatically sent to a flight director that implements a display mode for said computed set points to provide piloting assistance for the crew of the aircraft.

However, the avoidance guidance law computed using such a method is not optimal, the power required to keep the flight of the aircraft balanced being adapted to exceed the available power in the event the guidance law is not appropriate to see the avoidance through to completion.

SUMMARY OF THE INVENTION

The aim of the invention is therefore to propose a method and system making it possible to compute a better avoidance guidance law, by reducing the power required to keep the aircraft's flight balanced. In general, the new guidance law makes it possible to take performance constraints of the aircraft into account and better manage its energy.

To that end, the invention relates to a determination method of the aforementioned type, wherein during step a), at least one determined set point comprises a longitudinal component in a longitudinal direction perpendicular to the vertical direction.

With the determination method according to the invention, the use of a speed set point comprising a longitudinal component, such as an airspeed set point comprising both a vertical component and a longitudinal component, makes it possible to compute a better avoidance guidance law, in particular if the aircraft is a rotary wing aircraft.

In fact, on a rotary wing aircraft, the total power necessary to fly begins to decrease when the speed increases starting from a zero speed, since the induced power used to suspend the aircraft decreases. When the airspeed continues to increase, the parasitic power resulting from aerodynamic results of the relative wind on the aircraft increases, and the total required power also increases. There is therefore an airspeed where the required power is minimal. This optimal airspeed is also called best climb airspeed.

The use of a speed set point comprising a longitudinal component, such as the airspeed set point comprising both a vertical component and a longitudinal component, then makes it possible to determine a guidance law offering better management of the energy and power of the aircraft. The guidance law for example makes it possible to minimize the power necessary to avoid the obstacle(s) by varying said longitudinal component of the speed. The avoidance maneuver is then more lasting and safer with a greater power reserve between the available power and the required power.

According to other advantageous aspects of the invention, the determination method comprises one or more of the following features, considered alone or according to any technically possible combination(s):

during step a), a first set point and a second set point are determined, the first set point being a set point among the vertical speed set point and a flight path angle set point, the second set point being an airspeed set point, the first set point comprising a vertical component, and the second set point comprising a longitudinal component;

at least one set point comprises a target value and a current value, the avoidance guidance law being computed as a function of said current value, and said current value converges towards a target value according to a convergence law;

an authorized range of vertical speed values is determined from the vertical speed limit value(s) provided by the collision avoidance system, and the target value of the vertical speed set point is comprised in said authorized range;

the method further comprises the following step prior to step b):

+a') measuring one or more speeds of the aircraft in at least one direction among the vertical and longitudinal directions, and during step b), the avoidance guidance law is further computed as a function of the measured speed(s);

a vertical speed and an airspeed are measured during step a'), and when a first variable among the measured vertical speed and a vertical speed set point provided by an automatic pilot device is comprised in the authorized range of vertical speed values, the target value of the vertical speed set point is equal to the first variable and the target value of the airspeed set point is equal to a second variable from among the measured airspeed and an airspeed set point provided by the automatic pilot device, when the first variable is not comprised in said authorized range, the target value of the vertical speed set point is a value comprised in said authorized range and the target value of the airspeed set point is equal to a best climb airspeed or the second variable;

the method further comprises the following step prior to step b):

+a") measuring one or more accelerations of the aircraft in a direction among the vertical and longitudinal directions, and during step b), the avoidance guidance law is further computed as a function of the measured acceleration (s);

during step a"), a vertical acceleration and longitudinal acceleration are measured, and the avoidance guidance law is computed, during step b), on the one hand as a function of the set point among the vertical speed set point and the flight path angle and vertical acceleration set point, and on the other hand as a function of the airspeed and longitudinal acceleration set point;

the aircraft is a rotary wing aircraft, and step b) comprises computing at least one command from among an attitude variation and a collective lever variation;

during step b), the attitude variation command is computed using the following equation:

$$D\_THETA\_com=-K1\times(IAS\_consigne-IAS\_mesurée)+K2\times AX\_mesurée$$

where IAS_consigne is the airspeed set point,

IAS_mesurée is a measured airspeed,

AX_mesurée is a measured longitudinal acceleration, and

K1 and K2 are gains depending on at least the altitude and the speed;

during step b), the collective lever variation command is computed using the following equation:

$$D\_COLL\_com=K3\times(VZ\_consigne-VZ\_mesurée)-K4\times AZ\_mesurée$$

where VZ_consigne is the vertical speed set point,

VZ_mesurée is a measured vertical speed,

AZ_mesurée is a measured vertical acceleration, and

K3 and K4 are gains depending on at least the altitude and the speed; and the aircraft further comprises an automatic pilot device, and the method further comprises at least one subsequent step after step b) from among:

+c) displaying the avoidance guidance law computed during step b) on a screen visible by a crew of the aircraft, to provide the crew with assistance in performing an avoidance maneuver; and +c') sending the automatic pilot device the avoidance guidance law compute during step b), to perform a maneuver automatically to avoid the obstacle.

The invention also relates to a non-transitory computer-readable medium including a computer program product comprising software set points which, when implemented by a computer, carry out a method as defined above.

The invention also relates to an electronic system for determining an avoidance guidance law for an aircraft, such as a rotary wing aircraft, the aircraft comprising a collision avoidance system adapted to detect a collision risk with the obstacle(s), the system comprising means for determining one or more set points from among flight path angle and speed set points, at least one set point depending on at least one vertical speed limit value, at least one set point comprising a vertical component in a vertical direction, each vertical speed limit value being provided by the collision avoidance system following the detection of a collision risk with the obstacle(s); and means for computing the avoidance guidance law as a function of the determined speed set point(s), wherein at least one determined set point comprises a longitudinal component in a longitudinal direction perpendicular to the vertical direction.

The invention also relates to an aircraft, such as a rotary wing aircraft, comprising a collision avoidance system adapted to detect a collision risk with one or more obstacles and an electronic determination system as defined above.

BRIEF DESCRIPTION OF THE DRAWINGS

These features and advantages of the invention will appear more clearly upon reading the following description, provided solely as a non-limiting example, and done in reference to the appended drawings, in which.

DETAILED DESCRIPTION

Figure 1:
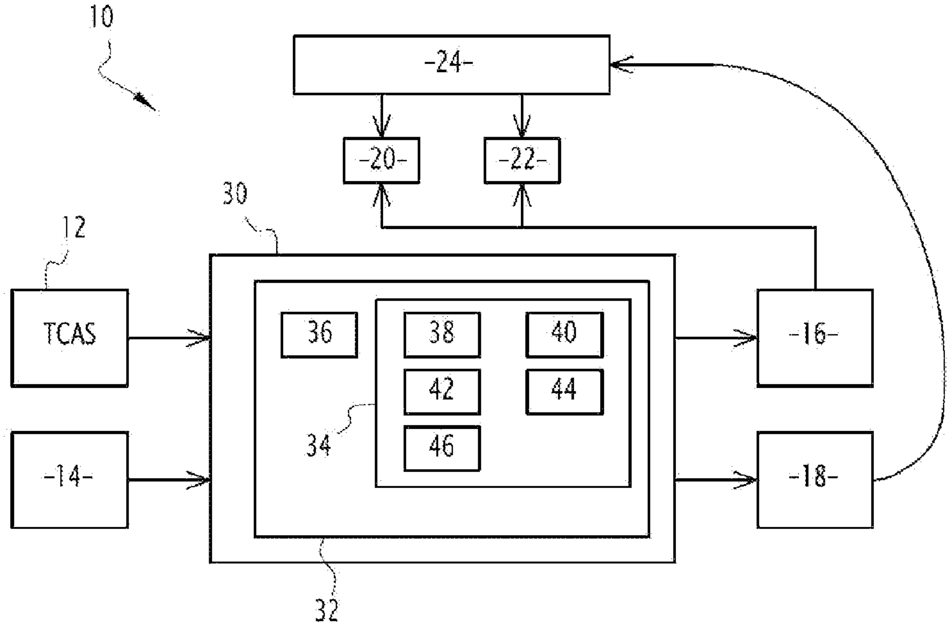
FIG. 1 is a diagrammatic view of an aircraft according to the invention, the aircraft comprising a collision avoidance system adapted to detect a collision risk with one or more obstacles, speed and acceleration measurement sensors, flight control members, an automatic pilot device, a data display screen and an electronic system for determining an avoidance guidance law.

In FIG. 1, an aircraft 10, such as a rotary wing aircraft, comprises a collision avoidance system 12 adapted to detect a collision risk with one or more obstacles, a set of sensors 14 adapted to measure speeds and accelerations of the aircraft 10, an automatic pilot device 16 of the aircraft and a data display screen 18.

The aircraft 10 also comprises a first control stick 20 and a second control stick 22, each forming a primary control member that can be manipulated by the crew 24 of the aircraft in order to pilot the aircraft.

According to the invention, the aircraft 10 further comprises an electronic system 30 for determining an avoidance guidance law for the aircraft to avoid obstacle(s).

The collision avoidance system 12, also called TCAS (Traffic Collision Avoidance System), is known per se, and is suitable for monitoring the airspace around the aircraft 10, in particular in order to detect other aircraft equipped with a corresponding active transponder. This detection is independent of the air traffic control done by air traffic controllers.

If a collision risk with one or more obstacles is identified, the collision avoidance system 12 is adapted to provide the determination system 30 with one or more vertical speed limit values. The determination system 30 is then adapted to determine an authorized range of vertical speed values from the vertical speed limit value(s) received from the collision avoidance system 12.

When the collision avoidance system 12 only provides a minimum vertical speed value, the authorized range of vertical speed values corresponds to the values above that minimum value. When the collision avoidance system 12 only provides a maximum vertical speed value, the authorized range of vertical speed values corresponds to the values below that maximum value. Lastly, when the collision avoidance system 12 provides both a minimum and maximum vertical speed value, the authorized range of vertical speed values is the set of values comprised between those minimum and maximum values.

The set of sensors 14 is suitable for measuring speeds and accelerations of the aircraft 10, in particular a vertical speed VZ and a vertical acceleration AZ in a vertical direction Z, i.e., a direction normal to the land surface, or a direction passing substantially through the center of the earth. Hereinafter, the measured vertical speed and the measured vertical acceleration are respectively denoted VZ_mesurée and AZ_mesurée.

One skilled in the art will of course understand that the invention applies similarly to the case where the flight path angle, also denoted FPA (Flight Path Angle), it is used instead of the vertical speed VZ, knowing that the transition from one variable to the other is done using the following equation:

$$FPA = \tan\left(\frac{VZ}{VX}\right) \tag{1}$$

where VX represents a longitudinal speed in a longitudinal direction X perpendicular to the vertical direction Z.

The set of sensors 14 is suitable for measuring an indicated airspeed (IAS), the indicated airspeed measured for the aircraft 10 being denoted IAS_mesurée. The indicated airspeed IAS comprises a vertical component in the vertical direction Z and a longitudinal component in the longitudinal direction X perpendicular to the vertical direction Z.

In the following of the description, the airspeed will correspond, by convention, to the indicated airspeed IAS. One skilled in the art will of course understand that the invention applies similarly to the case where the indicated airspeed is the calibrated airspeed (CAS) or the true airspeed (TAS), or the MACH.

The set of sensors 14 is also suitable for measuring a longitudinal acceleration AX of the aircraft 10 in a longitudinal direction X, the measured longitudinal acceleration being denoted AX_mesurée.

The automatic pilot device 16 is known per se, and when it is activated, makes it possible to act automatically on the trajectory of the aircraft 10, with no manipulation of one of the primary control members 20, 22 by the crew 24 of the aircraft.

The display screen 18 is adapted to display data, in particular data from the determination system 30, for example to provide piloting assistance to the crew 24 of the aircraft. In the example embodiment of FIG. 1, the display screen 18 is separate from the determination system 30. In an alternative that is not shown, the display screen 18 is incorporated into the determination system 30.

The first and second control sticks 20, 22 are known per se and form primary control members of the aircraft 10 that are manipulated by the crew 24 to pilot the aircraft.

The first control stick 20, also called collective lever, is suitable for controlling the climb or descent of the rotary wing aircraft 10 in a vertical plane containing the vertical direction Z and longitudinal direction X.

The second control stick 22, also called cyclic control stick or mini-control stick, is suitable for commanding a variation in the attitude of the rotary wing aircraft 10.

The determination system 30 comprises an information processing unit 32 for example formed by a memory 34 and a processor 36 associated with the memory 34.

In the example embodiment of FIG. 1, the determination system 30 is separate both from the collision avoidance system 12 and the automatic pilot device 16.

In an alternative that is not shown, the determination system 30 is incorporated into the automatic pilot device 16. The display screen 18 then for example corresponds to a display screen, not shown, of the automatic pilot device 16, and the information processing unit 32 corresponds to an information processing unit, not shown, of the automatic pilot device 16.

The memory 34 is adapted to store software 38 for acquiring measured speed values VZ_mesurée, IAS_mesurée and/or acceleration values AZ_mesurée, AX_mesurée from among the values provided by the set of sensors 14, for the vertical speed limit value(s) from the collision avoidance system 12, as well as any vertical speed set points VZ_PA and airspeed set points IAS_PA provided by the automatic pilot device 16.

The memory 34 is also adapted to store software 40 for determining one or more speed set points VZ_consigne, IAS_consigne, at least one speed set point VZ_consigne depending on at least one vertical speed limit value, at least one speed set point VZ_consigne, IAS_consigne comprising a vertical component in the vertical direction Z. According to the invention, at least one speed set point IAS_consigne determined by the determination software 40 comprises a longitudinal component in the longitudinal direction X.

The memory 34 is also adapted to store software 42 for computing an avoidance guidance law for an obstacle detected by the collision avoidance system 12, the computation of the guidance law being carried out as a function of the determined speed set point(s) VZ_consigne, IAS_consigne.

As an optional addition, the memory 34 is adapted to store display software 44 for displaying data relative to the computed avoidance guidance law on the screen 18.

As an optional addition, the memory 34 is adapted to store software 46 for sending the automatic pilot device 16 data relative to a computed avoidance guidance law, so that the avoidance maneuver is carried out automatically by the automatic pilot device 16. The data sent to the automatic pilot device 16 for example comprise an attitude variation command D_THETA_com and a collective lever variation command D_COLL_com.

The processor 36 is adapted to load and execute each of the software programs 38, 40, 42, 44 and 46.

The acquisition software 38, the determination software 40 and the computation software 42 respectively form means for acquiring measured speed and/or acceleration values, means for determining one or more speed set points and means for computing the avoidance guidance law.

Alternatively, the acquisition means 38, the determination means 40 and the computation means 42 are made in the form of programmable logic components, or in the form of dedicated integrated circuits.

As an optional addition, the display software 44 and the transmission software 46 respectively form means for displaying data on the screen 18 and means for sending data to the automatic pilot device 16.

As an alternative to this addition, the display means 44 and the transmission means 46 are made in the form of programmable logic components, or in the form of dedicated integrated circuits.

The acquisition software 38 is, for example, suitable for acquiring both measured vertical speed and airspeed values VZ_mesurée, IAS_mesurée and measured vertical and longitudinal acceleration values AZ_mesurée, AX_mesurée. The acquisition software 38 is also suitable for acquiring the vertical speed limit value(s) from the collision avoidance system 12, as well as any vertical speed VZ_PA and airspeed IAS_PA set points provided by the automatic pilot device 16.

The determination software 40 is for example suitable for computing a vertical speed set point VZ_consigne and an airspeed set point IAS_consigne. The vertical speed set point VZ_consigne comprises only a vertical component in the vertical direction Z, and the airspeed set point IAS_consigne comprises both a vertical component in the vertical direction Z and a longitudinal component in the longitudinal direction X.

In the described example embodiment, each speed set point VZ_consigne, IAS_consigne comprises a target value and a current value, the avoidance guidance law being computed as a function of the current value, and said current value converging toward the target value according to a convergence law.

In the following of the description, the target value and the current value of the vertical speed set point VZ_consigne are respectively denoted VZ_cons_cible and VZ_cons_courante. The target value and the current value of the airspeed set point IAS_consigne are respectively denoted IAS_cons_cible and IAS_cons_courante. The target value VZ_cons_cible of the vertical speed set point is comprised in the authorized range of vertical speed values VZ that is determined from the vertical speed limit value(s) provided by the collision avoidance system 12.

In the described example, the vertical speed set point VZ_consigne is then determined as a function of at least one vertical speed limit value provided by the collision avoidance system 12.

When a first variable VZ_référence chosen from among the measured vertical speed VZ_mesurée and any vertical speed set point VZ_PA provided by the automatic pilot device 16 is comprised in the authorized range of vertical speed values, as previously described, the target value VZ_cons_cible of the vertical speed set point is for example equal to the first variable VZ_référence and the target value IAS_cons_cible of the airspeed set point is for example equal to a second variable IAS_référence chosen from among the measured airspeed IAS_mesurée and any airspeed set point IAS_PA provided by the automatic pilot device 16.

Otherwise, when the first variable VZ_référence is not comprised in said authorized range, the target value VZ_cons_cible of the vertical speed set point is a value chosen from said authorized range and the target value IAS_cons_cible of the airspeed is for example equal to a best climb airspeed $IAS_{MM}$ or the second variable IAS_référence, as will be described in more detail below in reference to FIG. 4.

When a vertical speed set point VZ_PA is provided by the automatic pilot device 16, then the first variable VZ_référence is preferably equal to that set point VZ_PA received from the automatic pilot device 16. If the automatic pilot device 16 has not provided any vertical speed set point to the determination system 30, the first variable VZ_référence is then equal to the measured vertical speed VZ_mesurée.

Similarly, when an airspeed set point IAS_PA is provided by the automatic pilot device 16, then the second variable IAS_référence is preferably equal to that set point IAS_PA received from the automatic pilot device 16. If the automatic pilot device 16 has not provided any airspeed set point to the determination system 30, the second variable IAS_référence is then equal to the measured airspeed IAS_mesurée.

One skilled in the art will note that this logic is independent, i.e., separated, between the first variable VZ_référence and the second variable IAS_référence, the automatic pilot device 16 being adapted to provide only a vertical speed set point VZ_PA, or only an airspeed set point IAS_PA, or both a vertical speed set point VZ_PA and an airspeed set point IAS_PA, or no vertical speed set point VZ_PA and no airspeed set point IAS_PA.

Figure 2:
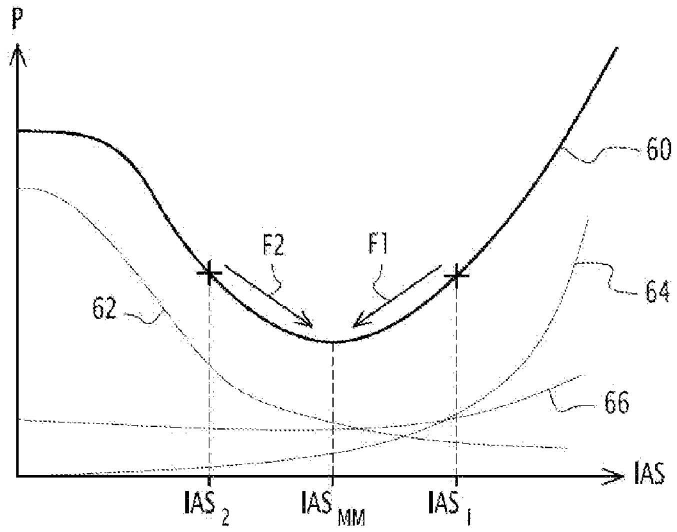
FIG. 2 is a set of curves showing different powers relative to the aircraft, as well as the total power required by the aircraft to fly.

The best climb airspeed $IAS_{MM}$, shown in FIG. 2, is the airspeed corresponding to a minimum value of the total power required to fly the aircraft 10, the total required power corresponding to the curve 60 in bold lines in FIG. 2. In FIG. 2, curve 62 represents the induced power used to sustain the aircraft 10, curve 64 shows the parasitic power resulting from the aerodynamic effects of the relative wind on the aircraft 10, and curve 66 shows the profile power resulting from the work of the drag forces on the blades, the total required power being the sum of the induced power, the parasitic power and the profile power.

The computation software 42 is suitable for computing the avoidance guidance law for the obstacle(s) as a function of the determined speed set point(s), for example on the one hand as a function of the vertical speed set point VZ_consigne, and in particular the current value VZ_cons_courante of that speed set point, and on the other hand as a function of the airspeed set point IAS_consigne, and in particular the current value IAS_cons_courante of that speed set point.

The guidance law calculated by the computation software 42 for example comprises two commands, i.e., a first command depending on the vertical speed set point VZ_consigne and the measured vertical speed VZ_mesurée, and a second command depending on the airspeed set point IAS_consigne and the measured airspeed IAS_mesurée.

Additionally, the computed guidance law also depends on the one hand on the vertical acceleration AZ, and on the other hand on the longitudinal acceleration AX. The first command then depends on the vertical speed set point VZ_consigne, in particular the current value VZ_cons_courante of that vertical speed set point, the measured vertical speed VZ_mesurée and the vertical acceleration AZ. Similarly, the second command then depends on the airspeed set point IAS_consigne, in particular the current value IAS_cons_courante of that airspeed set point, the measured airspeed IAS_mesurée and the longitudinal acceleration AX.

In the described example embodiment where the aircraft 10 is a rotary wing aircraft, the first command is the collective lever variation command D_COLL_com and the second command is the attitude variation command D_THETA_com.

The attitude variation command D_THETA_com for example verifies the following equation:

$$D\_\text{THETA\_com}=-K1\times(IAS\_\text{consigne}-IAS\_\text{mesurée})+K2\times AX\_\text{mesurée} \quad (2)$$

where IAS_consigne is the airspeed set point,
IAS_mesurée is a measured airspeed,
AX_mesurée is a measured longitudinal acceleration, and
K1 and K2 are gains depending on at least the altitude and the speed.

The gain K1 is expressed in degrees per $m \cdot s^{-1}$, and is for example comprised between 1 degree per $m \cdot s^{-1}$ and 6 degrees per $m \cdot s^{-1}$, typically equal to 3 degrees per $m \cdot s^{-1}$.

The gain K2 is expressed in degrees per $m \cdot s^{-2}$, and is for example comprised between 0 degrees per $m \cdot s^{-2}$ and 12 degrees per $m \cdot s^{-2}$, typically equal to 6 degrees per $m \cdot s^{-2}$.

When, in addition, the airspeed set point IAS_consigne comprises the target value IAS_cons_cible and the current value IAS_cons_courante, the attitude variation command D_THETA_com preferably verifies the following equation:

$$D\_THETA\_com = -K1 \times (IAS\_cons\_courante - IAS\_mesurée) + K2 \times AX\_mesurée \quad (3)$$

The collective lever variation command D_COLL_com for example verifies the following equation:

$$D\_COLL\_com = K3 \times (VZ\_consigne - VZ\_mesurée) - K4 \times AZ\_mesurée \quad (4)$$

where VZ_consigne is the vertical speed set point,
VZ_mesurée is a measured vertical speed,
AZ_mesurée is a measured vertical acceleration, and
K3 and K4 are gains depending on at least the altitude and the speed.

The gain K3 is expressed in % per $m \cdot s^{-1}$, and is for example comprised between 1% per $m \cdot s^{-1}$ and 4% per $m \cdot s^{-1}$, typically equal to 2% per $m \cdot s^{-1}$.

The gain K4 is expressed in % per $m \cdot s^{-2}$, and is for example comprised between 0% per $m \cdot s^{-2}$ and 4% per $m \cdot s^{-2}$, typically equal to 1% per $m \cdot s^{-2}$.

Similarly, when, in addition, the vertical speed set point VZ_consigne comprises the target value VZ_cons_cible and the current value VZ_cons_courante, the collective lever variation command D_COLL_com preferably verifies the following equation:

$$D\_COLL\_com = K3 \times (VZ\_cons\_courante - VZ\_mesurée) - K4 \times AZ\_mesurée \quad (5)$$

The operation of the determination system 30 according to the invention will now be described using FIGS. 3 and 4 respectively showing a flowchart of the method for determining the avoidance guidance law according to the invention and a detailed flowchart of the step for determining the target values VZ_cons_cible, IAS_cons_cible of the speed set points.

During an initial step 100, vertical and airspeed values VZ_mesurée, IAS_mesurée are measured by the set of sensors 14, then acquired by the acquisition software 38. Additionally, vertical and longitudinal acceleration values AZ_mesurée, AX_mesurée are measured by the set of sensors 14, then acquired by the acquisition software 38. These different speed and acceleration values are preferably measured at the same moment in time. The acquisition software 38 also acquires the vertical speed limit value(s) from the collision avoidance system 12, as well as any vertical speed VZ_PA and airspeed IAS_PA set points provided by the automatic pilot device 16.

During step 110, the determination software 40 next determines the vertical speed set point VZ_consigne and the airspeed set point IAS_consigne, in particular using measured vertical and airspeed values VZ_mesurée, IAS_mesurée previously acquired. This determination step 110 is split into sub-steps shown in FIG. 4.

Figure 4:
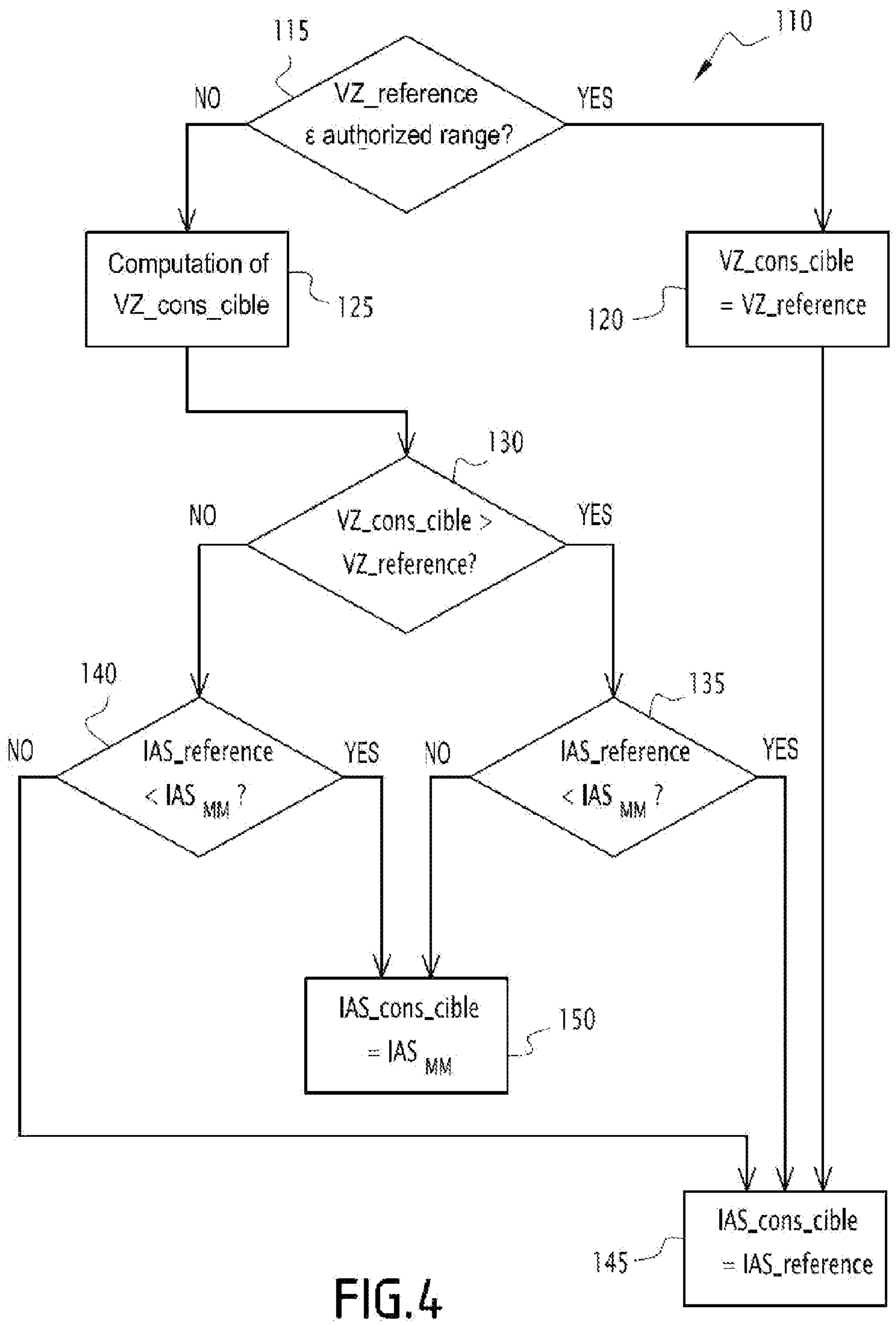
FIG. 4 is a more detailed flowchart of a step for determining speed set points of the flowchart of FIG. 3.

In FIG. 4, during sub-step 115, the determination software 40 begins by determining whether the first variable VZ_référence is in the authorized range of vertical speed values. As previously described, the authorized range of vertical speed values is defined from the vertical speed limit value(s) received from the collision avoidance system 12.

If the first variable VZ_référence is in the authorized range of vertical speed values, then during sub-step 120 the determination software 40 determines the target value VZ_cons_cible of the vertical speed set point as being equal to the first variable VZ_référence.

Otherwise, during sub-step 125, the determination software 40 computes the target value VZ_cons_cible of the vertical speed set point by choosing a value within the authorized range of vertical speed values. The selected value is for example the value of said authorized range that is closest to the first variable VZ_référence. Alternatively, the selected value is the value from said authorized range that is closest to the first variable VZ_référence, to or from which a margin is added or subtracted so that the selected target value VZ_cons_cible is separated from said vertical speed limit value(s) by at least that margin.

During sub-step 130, the determination software 40 next determines whether the target value VZ_cons_cible of the vertical speed set point previously computed during sub-step 125 is greater than the first variable VZ_référence.

If the computed target value VZ_cons_cible of the vertical speed set point is greater than the first variable VZ_référence, then the determination software 40 next verifies, during sub-step 135, whether the second variable IAS_référence is lower than the best climb airspeed $IAS_{MM}$.

If the computed target value VZ_cons_cible of the vertical speed set point is, contrariwise, less than the first variable VZ_référence, the determination software 40 verifies, during sub-step 140, whether the second variable IAS_référence is lower than the best climb airspeed $IAS_{MM}$.

During sub-step 135, if the second variable IAS_référence is lower than the best climb airspeed $IAS_{MM}$, then the determination software 40 determines, during sub-step 145, the target value IAS_cons_cible of the airspeed set point as being equal to the second variable IAS_référence.

If, however, during sub-step 135, the second variable IAS_référence is greater than or equal to the best climb airspeed $IAS_{MM}$, then the determination software 40 determines, during sub-step 150, the target value IAS_cons_cible of the airspeed set point as being equal to the best climb airspeed $IAS_{MM}$.

During sub-step 140, if the second variable IAS_référence is lower than the best climb airspeed IASMM, then the determination software 40 goes on to sub-step 150, and the target value IAS_cons_cible of the airspeed set point is then equal to the best climb airspeed $IAS_{MM}$.

If, however, during sub-step 140, the second variable IAS_référence is greater than or equal to the best climb airspeed IASMM, then the determination software 40 goes on to sub-step 145, and the target value IAS_cons_cible of the airspeed set point is then equal to the second variable IAS_référence.

After sub-step 120, the determination software 40 goes on to sub-step 145, and the target value IAS_cons_cible of the airspeed set point is then equal to the second variable IAS_référence.

In other words, the strategy for determining the target value IAS_cons_cible of the airspeed set point is as follows:

- if the target value VZ_cons_cible of the vertical speed set point is unchanged relative to the first variable VZ_référence (sub-step 120), then the target value IAS_cons_cible of the airspeed set point is also unchanged, and equal to the second variable IAS_référence;

- if the target value VZ_cons_cible of the vertical speed set point is greater than the first variable VZ_référence (positive response to the test in sub-step 130), i.e., if the vertical speed must be increased, and if the second variable IAS_référence is greater than the best climb airspeed $IAS_{MM}$ (negative response to the test in sub-step 135), then the best climb airspeed $IAS_{MM}$ is used as the target value IAS_cons_cible for the airspeed set point. This makes it possible to use the kinetic energy to facilitate the climb, as shown in FIG. 2 with the airspeed $IAS_1$ and arrow F1, and decreases the total power required over the longer term, i.e., when the airspeed comes closer to the best climb airspeed.
- if the target value VZ_cons_cible of the vertical speed set point is less than or equal to the first variable VZ_référence (negative response to the test in sub-step 130), i.e., if the vertical speed must be decreased, and if the second variable IAS_référence is lower than the best climb airspeed $IAS_{MM}$ (positive response to the test in sub-step 140), the best climb airspeed $IAS_{MM}$ is also used as target value IAS_cons_cible for the airspeed set point. This makes it possible to transfer energy facilitating the descent, as shown in FIG. 2 with the airspeed $IAS_2$ and arrow F2, and places the aircraft 10 in a good configuration to execute other maneuvers while increasing the available power margin via the decrease of the total required power.
- in the other cases (positive response to the test in sub-step 135 or negative response to the test in sub-step 140), the target value IAS_cons_cible of the airspeed set point is unchanged, and equal to the second variable IAS_référence.

At the end of step 110, after sub-step 145 or sub-step 150, the determination software 40 also determines the current values IAS_cons_courante, VZ_cons_courante of the airspeed set point and the vertical speed set point using the target values IAS_cons_cible, VZ_cons_cible previously determined as a function of the convergence law of the current value toward the corresponding target value.

The convergence of the current value VZ_cons_courante of the vertical speed set point toward the corresponding target value VZ_cons_cible for example follows an affine law. In other words, the dynamic for the current value VZ_cons_courante to join the target value VZ_cons_cible, i.e., the drift relative to time of the current value VZ_cons_courante, is constant as long as the target value VZ_cons_cible has not been reached. The drift relative to time of the current value VZ_cons_courante is for example equal, in absolute value, to 400 feet/minute per second. The choice of the convergence law then makes it possible to guarantee a vertical acceleration making it possible to ensure a rapid response to avoid the obstacle(s), while retaining a certain power margin.

The dynamic for the current value IAS_cons_courante of the airspeed set point to join the target value IAS_cons_cible, i.e., the drift relative to time of the current value IAS_cons_courante, for example depends on the measured airspeed IAS_mesurée and the difference between the target value IAS_cons_cible and the current value IAS_cons_courante of the airspeed set point. The absolute value of the drift relative to time of the current value IAS_cons_courante for example verifies the following equation:

$$\left|\frac{d\text{IAS\_cons\_courante}}{dt}\right| = K \times |\text{VZ\_cons\_cible} - \text{VZ\_cons\_courante}| \tag{6}$$

for values of K*|VZ_cons_cible−VZ_cons_courante| comprised between a minimum longitudinal acceleration AXmin and a maximum longitudinal acceleration AXmax; where K is a gain expressed by knots per second per feet per minute.

The sign of the drift relative to time of the current value IAS_cons_courante is that of the difference between the target value and the current value of the airspeed set point, denoted IAS_cons_cible−IAS_cons_courante. The current value IAS_cons_courante of the airspeed set point then converges toward the target value IAS_cons_cible.

In other words, the drift relative to time of the current value IAS_cons_courante for example verifies the following equation:

$$\frac{d\text{IAS\_cons\_courante}}{dt} = \text{sgn}(\text{IAS\_cons\_cible} - \text{IAS\_cons\_courante}) \times med(K \times |\text{VZ\_cons\_cible} - \text{VZ\_cons\_courante}|, AX\min, AX\max) \tag{7}$$

where sgn is the sign function, which is equal to +1 if the difference (IAS_cons_cible−IAS_cons_courante) is positive, 0 if it is null and −1 if it is negative;

med is the median function, which is equal to the median value of the three values (K*|VZ_cons_cible−VZ_cons_courante|), AXmin and AXmax. This makes it possible to limit oneself to values of the longitudinal acceleration AX comprised between the minimum longitudinal acceleration AXmin and the maximum longitudinal acceleration AXmax.

As an example, the value of the gain K is equal to 1/500 knots per foot per minute, the minimum and maximum values of the longitudinal acceleration AXmin and AXmax are respectively equal to 1 knot per second and 2 knots per second.

With this value example, if the vertical speed deviation is greater than 1000 feet, the current value of the airspeed set point IAS_cons_courante converges at 2 knots per second toward the target value IAS_cons_cible. If the vertical speed deviation is comprised between 500 and 1000 feet, the current value of the airspeed set point IAS_cons_courante converges toward the target value IAS_cons_cible at K times the computed vertical speed deviation. Lastly, if the vertical speed deviation is less than 500 feet, the current value of the airspeed set point IAS_cons_courante converges at 1 knot per second toward the target value IAS_cons_cible.

This then makes it possible to accelerate the joining dynamic for the airspeed when the performance requires it, or will require it shortly, or on the contrary offers a slower joining dynamic for the airspeed if the avoidance maneuver does not require an excessively significant dynamic. In the latter case, this then makes it possible to retain a more significant power margin for better safety of the aircraft 10.

Alternatively, the drift relative to time of the convergence law of the current value IAS_cons_courante toward the target value IAS_cons_cible is constant, and for example equal in absolute value to 1 knot per second.

Figure 3:
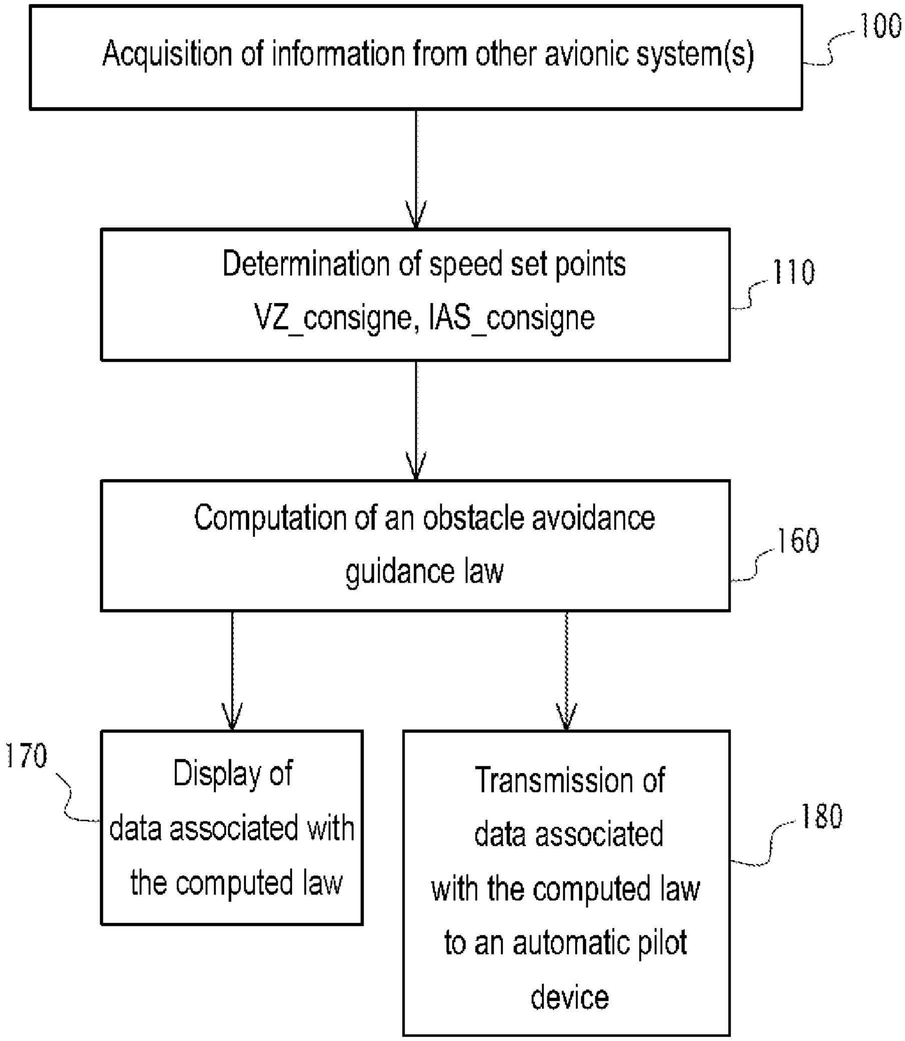
FIG. 3 is a flowchart of a method, according to the invention, for determining an avoidance guidance law, the method being implemented by the determination system of FIG. 1.

During step 160, shown in FIG. 3, the computation software 42 next computes the avoidance guidance law for the obstacle based on the determined speed set point(s). In the described example, the computation software 42 computes the attitude variation command D_THETA_com as a function of the current value IAS_cons_courante of the airspeed set point, the measured airspeed IAS_mesurée and the measured longitudinal acceleration AX_mesurée according to equation (2). The computation software 42 also computes the collective lever variation command D_COLL_com as a function of the current value VZ_cons_courante of the vertical speed set point, the measured vertical speed VZ_mesurée and the measured vertical acceleration AZ_mesurée according to equation (4).

After step 160, the determination system 30 goes on to step 170, during which its display software 44 manages the display on the screen 18 of data relative to the computed avoidance guidance law.

Alternatively or additionally, after step 160, the determination system 30 goes on to step 180, during which its transmission software 46 sends the automatic pilot device 16 the data relative to the computed avoidance guidance law, so that the avoidance maneuver is done automatically by the automatic pilot device 16. The transmission software 46 in particular sends the values of the attitude D_THETA_com and collective lever D_COLL_com variation commands previously computed during step 160.

At the end of step 160, the determination system 30 returns to step 100 in order to acquire, via its acquisition software 38, new values of the measured vertical and aircraft velocities VZ_mesurée, IAS_mesurée and measured vertical and longitudinal accelerations AZ_mesurée, AX_mesurée.

After having returned to step 100, the determination step 30 goes on to step 110 in order to determine new speed set points. This new determination is preferably done by varying only the current values VZ_cons_courante and IAS_cons_courante of the vertical speed and airspeed set points toward their respective target values VZ_cons_cible and IAS_cons_cible as a function of the associated convergence laws, and while keeping the target values VZ_cons_cible and IAS_cons_cible determined during the first passage by step 110.

The respective target values VZ_cons_cible and IAS_cons_cible are preferably modified only if there is a modification of the data coming from the collision avoidance system 12 or data coming from the automatic pilot device 16. In other words, the respective target values VZ_cons_cible and IAS_cons_cible are then modified only if it is necessary to change the avoidance maneuver, for example following a new obstacle, or following an end of obstacle, or following a modification of the trajectory of the obstacle.

The determination system 30 and the determination method according to the invention make it possible to compute a better avoidance guidance law by taking into account not only a speed set point comprising a vertical component in the vertical direction Z, as is done in the state of the art while taking into account only the vertical speed set point, but also a speed set point comprising a longitudinal component in the longitudinal direction X perpendicular to the vertical direction Z. The speed set point comprising the longitudinal component is for example the airspeed set point, which comprises both the vertical component and a longitudinal component.

The avoidance guidance law thus determined according to the invention then makes it possible to propose better management of the energy of the aircraft 10, in particular by minimizing the power required to perform the avoidance maneuver. The avoidance maneuver is then more lasting and safer, in particular by bringing the aircraft 10 to a balanced flight point corresponding to the best climb airspeed $IAS_{MM}$.

The energy management also makes it possible to perform faster avoidance maneuvers, in particular in the event of a conversion of the kinetic energy from the forward speed into potential energy to climb more quickly, as shown by arrow F1 in FIG. 2.

When each speed set point VZ_consigne, IAS_consigne further has a target value VZ_cons_cible, IAS_cons_cible and a current value VZ_cons_courante, IAS_cons_courante, with a convergence law of the current value toward the corresponding target value, the choice of the convergence laws makes it possible to perform a more natural avoidance maneuver, i.e., closer to the maneuver that would be done by a pilot.

According to a second embodiment, the determination system 30 is suitable for determining a flight path angle set point FPA_consigne in place of the vertical speed set point VZ_consigne. In fact, in light of the relationship previously described using equation (1) between the vertical speed VZ and the flight path angle FPA, one skilled in the art will understand that the determination system 30 is also suitable for computing the avoidance guidance law as a function of the determined flight path angle set point FPA_consigne and airspeed set point IAS_consigne.

Similarly to what was previously described for the first embodiment, the flight path angle set point FPA_consigne and the airspeed set point IAS_consigne each for example comprise a target value FPA_cons_cible, IAS_cons_cible and a current value FPA_cons_courante, IAS_cons_courante, the avoidance guidance law being computed as a function of the current value, and said current value then converging toward the target value according to a convergence law.

The attitude variation command D_THETA_com for example verifies equation (2), or optionally in addition equation (3), previously described for the first reception mode, with unchanged gain values K1, K2.

According to this second embodiment, the collective lever variation command D_COLL_com then for example verifies the following equation:

$$D\_COLL\_com = K5\times(\text{FPA\_consigne}-\text{FPA\_mesurée}) - K6\times AZ\_\text{mesurée} \tag{8}$$

where FPA_consigne is the flight path angle set point,
FPA_mesurée is a measured flight path angle,
AZ_mesurée is a measured vertical acceleration, and
K5 and K6 are gains depending on at least the altitude and the speed.

The gain K5 is expressed in % per degree, and is for example comprised between 0.2% per degree and 8% per degree, typically equal to 1% per degree.

The gain K6 is expressed in % per degree·$s^{-1}$, and is for example comprised between 0% per degree·$s^{-1}$ and 8% per degree·$s^{-1}$, typically equal to 0.5% per degree·$s^{-1}$.

Similarly, when as an optional addition, the flight path angle set point FPA_consigne comprises the target value FPA_cons_cible and the current value FPA_cons_courante, the collective lever variation command D_COLL_com preferably verifies the following equation:

$$D\_COLL\_com = K5\times(\text{FPA\_cons\_courante}-\text{FPA\_mesurée}) - K6\times AZ\_\text{mesurée} \tag{9}$$

According to this second embodiment, the flight path angle set point VZ_consigne is then for example determined as a function of at least one vertical speed limit value provided by the collision avoidance system 12, more specifically as a function of an authorized range of flight path angle values, computed using equation (1) and the authorized range of vertical speed values previously described for the first embodiment.

When a third variable FPA_référence chosen from among the measured flight path angle FPA_mesurée and any flight path angle set point FPA_PA provided by the automatic pilot device 16 is comprised in the authorized range of flight path angle values, the target value FPA_cons_cible of the flight path angle set point is for example equal to the third variable FPA_référence, and the target value IAS_cons_cible of the airspeed set point is for example equal to the second variable IAS_référence chosen from among the measured airspeed IAS_mesurée and any airspeed set point IAS_PA provided by the automatic pilot device 16.

Otherwise, when the third variable FPA_référence is not comprised in said authorized range of flight path angle values, the target value FPA_cons_cible of the flight path angle set point is a value chosen from said authorized range of flight path angle values and the target value IAS_cons_cible of the airspeed set point is for example equal to a best climb airspeed $IAS_{MM}$ or the second variable IAS_référence.

The operation of the determination system 30 according to this second embodiment is then similar to that previously described for the first embodiment, each time replacing the vertical speed set point VZ_consigne with the flight path angle set point FPA_consigne, or additionally the current value VZ_cons_courante and the target value VZ_cons_cible of the vertical speed set point by the current value FPA_cons_courante and the target value FPA_cons_cible of the flight path angle set point, respectively, as well as by replacing the first variable VZ_référence with the third variable FPA_référence if applicable, as described above.

According to this second embodiment, the determination software 40 thus determines the flight path angle set point FPA_consigne and the airspeed set point IAS_consigne during step 110, using the measured flight path angle and airspeed values FPA_mesurée, IAS_mesurée acquired previously during step 100.

This determination step 110 is split into sub-steps, similarly to what was previously described for the first embodiment in reference to FIG. 4, replacing the first variable VZ_référence with the third variable FPA_référence as well as the current value VZ_cons_courante and the target value VZ_cons_cible of the vertical speed set point by the current value FPA_cons_courante and the target value FPA_cons_cible of the flight path angle set point, respectively.

The convergence of the current value FPA_cons_courante of the flight path angle set point toward the corresponding target value FPA_cons_cible for example follows an affine law. The drift relative to time of the current value FPA_cons_courante is for example equal in absolute value to 4 degrees per second.

The dynamic for the current value IAS_cons_courante of the airspeed set point to join the target value IAS_cons_cible, i.e., the drift relative to time of the current value IAS_cons_courante, for example depends on the measured airspeed IAS_mesurée and the difference between the target value IAS_cons_cible and the current value IAS_cons_courante of the airspeed set point.

According to this second embodiment, the absolute value of the drift relative to time of the current value IAS_cons_courante for example verifies the following equation:

$$\left|\frac{d\text{IAS\_cons\_courante}}{dt}\right| = K' \times |\text{FPA\_cons\_cible} - \text{FPA\_cons\_courante}| \qquad (10)$$

for values of the longitudinal acceleration AX comprised between a minimum longitudinal acceleration AXmin and a maximum longitudinal acceleration AXmax;

where K' is a gain expressed in knots per second per degree.

The drift relative to time of the current value IAS_cons_courante for example verifies the following equation:

$$\frac{d\text{IAS\_cons\_courante}}{dt} = \text{sgn}(\text{IAS\_cons\_cible} - \text{IAS\_cons\_courante}) \times med(K' \times |\text{FPA\_cons\_cible} - \text{FPA\_cons\_courante}|, AX\text{min}, AX\text{max}) \qquad (11)$$

where sgn is the sign function, which is equal to +1 if the difference (IAS_cons_cible−IAS_cons_courante) is positive, 0 if it is null and −1 if it is negative;

med is the median function, which is equal to the median value of the three values (K'*|FPA_cons_cible−FPA_cons_courante|), AXmin and AXmax. This makes it possible to limit oneself to values of the longitudinal acceleration AX comprised between the minimum longitudinal acceleration AXmin and the maximum longitudinal acceleration AXmax.

As an example, the value of the gain K' is equal to 0.25 knots per second per degree, and the minimum and maximum values of the longitudinal acceleration AXmin and AXmax are respectively equals 1 knot per second and 2 knots per second.

The advantages of the second embodiment are identical to those of the first embodiment previously described, and are not described again.

One skilled in the art will understand that the avoidance guidance law is a guidance law computed in order to avoid the obstacle(s), the guidance law comprising one or more guidance commands for the aircraft 10. As previously indicated, the computer guidance law for example comprises two commands, i.e., a first command depending on the vertical speed set point VZ_consigne and the measured vertical speed VZ_mesurée, and a second command depending on the airspeed set point IAS_consigne and measured airspeed IAS_mesurée.

The invention claimed is:

1. A method for determining an avoidance guidance law for an aircraft to avoid one or more obstacles, the aircraft comprising a collision avoidance system adapted to detect a collision risk with the obstacles and an electronic system for determining the avoidance guidance law, the method being implemented by the system for determining the avoidance guidance law, the method comprising the following steps:

a) determining one or more set points from among flight path angle and speed set points, at least one set point depending on at least one vertical speed limit value, at least one set point comprising a vertical component in a vertical direction, each vertical speed limit value being provided by the collision avoidance system following the detection of a collision risk with the obstacles, b) computing the avoidance guidance law as a function of the determined set point(s), wherein during step a), at least one determined set point comprises a longitudinal component in a longitudinal direction perpendicular to the vertical direction, wherein the aircraft further comprises an automatic pilot device, wherein the method further comprises at least one subsequent step after step b) from among:

c) displaying the avoidance guidance law computed during step b) on a screen visible by a crew of the aircraft, to provide the crew with assistance in performing an avoidance maneuver; and c') sending to the automatic pilot device the avoidance guidance law computed during step b), to perform a maneuver automatically to avoid the obstacle.

2. The method according to claim 1, wherein, during step a), a first set point and a second set point are determined, the first set point being a set point among a vertical speed set point and a flight path angle set point, the second set point being an airspeed set point, the first set point comprising a vertical component, and the second set point comprising a longitudinal component.

3. The method according to claim 1, wherein at least one set point comprises a target value and a current value, the avoidance guidance law being computed as a function of said current value, and said current value converges towards said target value according to a convergence law.

4. The method according to claim 3, wherein, during step a), a first set point and a second set point are determined, the first set point being a set point among a vertical speed set point and a flight path angle set point, the second set point being an airspeed set point, the first set point comprising a vertical component, and the second set point comprising a longitudinal component, and wherein an authorized range of vertical speed values is determined from the vertical speed limit value provided by the collision avoidance system, and the target value of the vertical speed set point is comprised in said authorized range.

5. The method according to claim 1, wherein before step b), the method further comprises the following step:

a') measuring one or more speeds of the aircraft in at least one direction among the vertical and longitudinal directions, and wherein during step b), the avoidance guidance law is further computed as a function of the measured speed.

6. The method according to claim 5, wherein, during step a), a first set point and a second set point are determined, the first set point being a set point among a vertical speed set point and a flight path angle set point, the second set point being an airspeed set point, the first set point comprising a vertical component, and the second set point comprising a longitudinal component, wherein an authorized range of vertical speed values is determined from the vertical speed limit value provided by the collision avoidance system, and the target value of the vertical speed set point is comprised in said authorized range, wherein a vertical speed and an airspeed are measured during step a'), and when a first variable among the measured vertical speed and a vertical speed set point provided by the automatic pilot device is comprised in the authorized range of vertical speed values, the target value of the vertical speed set point is equal to the first variable and the target value of the airspeed set point is equal to a second variable from among the measured airspeed and an airspeed set point provided by the automatic pilot device, when the first variable is not comprised in said authorized range, the target value of the vertical speed set point is a value comprised in said authorized range and the target value of the airspeed set point is equal to a best climb airspeed or the second variable.

7. The method according to claim 1, wherein before step b), the method further comprises the following step:

a') measuring one or more accelerations of the aircraft in a direction among the vertical and longitudinal directions, and wherein during step b), the avoidance guidance law is further computed as a function of the measured acceleration.

8. The method according to claim 7, wherein, during step a"), a vertical acceleration and longitudinal acceleration are measured, and the avoidance guidance law is computed, during step b), on the one hand as a function of the set point among the vertical speed set point and the flight path angle and vertical acceleration set point, and on the other hand as a function of the airspeed and longitudinal acceleration set point.

9. The method according to claim 1, wherein the aircraft is a rotary wing aircraft, and step b) comprises computing at least one command from among an attitude variation command and a collective lever variation command.

10. The method according to claim 9, wherein before step b), the method further comprises the following step:

a') measuring one or more speeds of the aircraft in at least one direction among the vertical and longitudinal directions, measuring one or more accelerations of the aircraft in a direction among the vertical and longitudinal directions, and wherein during step b), the avoidance guidance law is further computed as a function of the measured speed and of the measured acceleration, wherein, during step b), the attitude variation command is computed using the following equation:

$$D\_\text{THETA\_com} = -K1 \times (IAS\_\text{consigne} - IAS\_\text{mesurée}) + K2 \times AX\_\text{mesurée}$$

where IAS_consigne is the airspeed set point,

IAS_mesurée is a measured airspeed,

AX_mesurée is a measured longitudinal acceleration, and

K1 and K2 are gains depending on at least the altitude and the speed.

11. The method according to claim 10, wherein, during step b), the collective lever variation command is computed using the following equation:

$$D\_\text{COLL\_com} = K3 \times (VZ\_\text{consigne} - VZ\_\text{mesurée}) - K4 \times AZ\_\text{mesurée}$$

where VZ_consigne is the vertical speed set point,

VZ_mesurée is a measured vertical speed,

AZ_mesurée is a measured vertical acceleration, and

K3 and K4 are gains depending on at least the altitude and the speed.

12. A non-transitory computer-readable medium including a computer program product including software instructions which, when implemented by a computer, implement a method according to claim 1.

13. An electronic determination system for determining an avoidance guidance law for an aircraft to avoid one or more obstacles, the aircraft comprising a collision avoidance system adapted to detect a collision risk with the obstacle and an automatic pilot device, the system comprising:

a device determining one or more set points from among flight path angle and speed set points, at least one set point depending on at least one vertical speed limit value, at least one set point comprising a vertical component in a vertical direction, each vertical speed limit value being provided by the collision avoidance system following the detection of a collision risk with the obstacle, a computing device computing the avoidance guidance law as a function of the determined speed set point, wherein at least one determined set point comprises a longitudinal component in a longitudinal direction perpendicular to the vertical direction, wherein the system further comprises at least one device from among:

a device for displaying the avoidance guidance law on a screen visible by a crew of the aircraft, to provide the crew with assistance in performing an avoidance maneuver; and a device for sending to the automatic pilot device the avoidance guidance law, to perform a maneuver automatically to avoid the obstacle.

14. An aircraft comprising a collision avoidance system adapted to detect a collision risk with one or more obstacles and an electronic determination system for determining an avoidance guidance law for the aircraft, wherein the electronic determination system is according to claim 13.

* * * * *